United States Patent [19]
Persson

[11] Patent Number: 5,225,827
[45] Date of Patent: Jul. 6, 1993

[54] WARNING DEVICE IN A MOTOR VEHICLE FOR DETECTION OF UNINTENTIONAL CHANGE OF COURSE

[76] Inventor: Göran Persson, Borgvägen 6, S-387 00 Borgholm, Sweden

[21] Appl. No.: 678,945
[22] PCT Filed: Oct. 20, 1989
[86] PCT No.: PCT/SE89/00580
    § 371 Date: Apr. 16, 1991
    § 102(e) Date: Apr. 16, 1991
[87] PCT Pub. No.: WO90/04528
    PCT Pub. Date: May 3, 1990

[30] Foreign Application Priority Data
Oct. 24, 1988 [SE] Sweden .................. 8803784

[51] Int. Cl.⁵ .............................................. G08G 1/00
[52] U.S. Cl. .................................. 340/904; 340/901; 250/202
[58] Field of Search ............... 340/904, 905, 901; 250/210, 202; 180/169

[56] References Cited

U.S. PATENT DOCUMENTS

| | | | |
|---|---|---|---|
| 3,201,750 | 8/1965 | Morin | 340/901 X |
| 3,353,619 | 11/1967 | Lambert | 180/168 |
| 3,559,756 | 2/1971 | Torres | 180/169 |
| 4,143,264 | 3/1979 | Gilbert et al. | 250/210 |
| 4,348,652 | 9/1982 | Barnes et al. | 340/904 |
| 4,528,563 | 7/1985 | Takeuchi | 340/904 X |
| 4,858,132 | 8/1989 | Holmquist | 180/169 X |
| 4,970,509 | 11/1990 | Kissinger, Sr. | 340/901 |

FOREIGN PATENT DOCUMENTS

| | | |
|---|---|---|
| 2064839 | 7/1972 | Fed. Rep. of Germany . |
| 2400290 | 7/1974 | Fed. Rep. of Germany . |
| 3240498 | 5/1984 | Fed. Rep. of Germany ...... 340/901 |

Primary Examiner—Jin F. Ng
Assistant Examiner—Jeffery A. Hofsass
Attorney, Agent, or Firm—Ladas & Parry

[57] ABSTRACT

The invention relates to a warning device in a motor vehicle for detection of unintentional change of course. The invention utilizes existing white road lines being scanned by two detectors (A) mounted far out in the front on the left-hand and the right-hand side of the bumper of the vehicle. IR transmitting diodes (1) located in the detectors are fed from a transmitting unit of an electronic unit mounted in the vehicle with a pulsed signal voltage. The light emitted from the IR diode (1) is reflected by the lines (10) of the roadway (11) to an IR receiving diode (12) mounted in the detector (A), this diode not being affected by visible natural and/or artifical light but is only activated by the pulsed, reflected IR light. The signal voltage received by the IR receiving diode (12) is connected to two receiving parts mounted in the electronic unit, one for the right-hand and one for the left-hand side of the vehicle compartment, for conversion into an acoustic or an optical warning signal to the driver.

6 Claims, 4 Drawing Sheets

WARNING DEVICE IN A MOTOR VEHICLE FOR DETECTION OF UNINTENTIONAL CHANGE OF COURSE

FIELD OF THE INVENTION

The invention relates to a device for increased road safety and more particularly a warning device for motor vehicles, the object of which is to prevent or reduce traffic accidents by the driver's attention being drawn to his unintentionally crossing the centre line of the roadway and on the way into the oncoming traffic lane, or his being on the way over the edge line driving off the road. The device also warns drivers attempting to overtake or to change their driving direction without flashing the blinkers, and functions as an orientational aid in a dense fog and in parking on marked parking slots.

It is a serious and a well known problem with all traffic accidents which occur for various reasons and which tend to increase with the increased traffic intensity. A kind of accident that occurs too often is when a driver of a motor vehicle dozes off or even falls asleep at the wheel and crosses the road centre line and drives into the oncoming traffic lane, or drives off the road to the right, in both cases too often resulting in disastrous consequences.

A further, typical traffic problem is drivers who neglect to flash the blinkers when overtaking or when turning left or right, which will often cause serious accidents or incidents.

TECHNICAL BACKGROUND

In the solutions known so far only daylight or lamplight has been used. This has a disadvantage in that scattered light and reflections from visible light may give false indications. Another disadvantage is that the known device requires a compensation for the light receiver with regard to the ambient varying light conditions.

SUMMARY OF THE INVENTION

In the present invention said drawbacks are avoided by using pulsed infrared (IR) light. Further advantages of IR light is a low power consumption, a large vibration endurance, a long life of the IR diodes compared with light bulbs. The system admits the possibility of a higher mounting height from the roadway, without jeopardizing the function.

Yet another advantage is that upon activation of the direction indicator (blinkers) the function of the device according to the invention may be blocked in order to avoid undue warning signals when the white marking lines on the roadway are intentionally crossed, such as in change of lanes, overtakings, or right and left turns, respectively.

The object of the invention is to prevent or mitigate the effect of personal injuries or vehicle damage, which often occur when a driver dozes off or falls asleep at the wheel and as a consequence unintentionally leaves the correct lane, and when a driver neglects to flash the blinkers when overtaking and in other changes of lanes or driving directions, which, unfortunately, often also causes serious accidents and incidents. Said object is achieved by the characteristics defined in the attached claims.

BRIEF DESCRIPTION OF THE DRAWINGS

The invention is described below with reference to the attached figures, in which FIG. 1 discloses a motor vehicle driving on a roadway, with an example of the road centre line and the edge lines, FIG. 2 discloses a motor car, viewed from the front, having a detector A, an electronic unit B and buzzers C according to the invention mounted, FIG. 3 discloses a front of a motor car, viewed from the right-hand side having a detector A mounted, FIG. 4 discloses a complete detector unit A according to the invention, and FIG. 5 discloses a block diagram of the warning device according to the invention.

DESCRIPTION OF A PREFERRED EMBODIMENT

Figure 1:
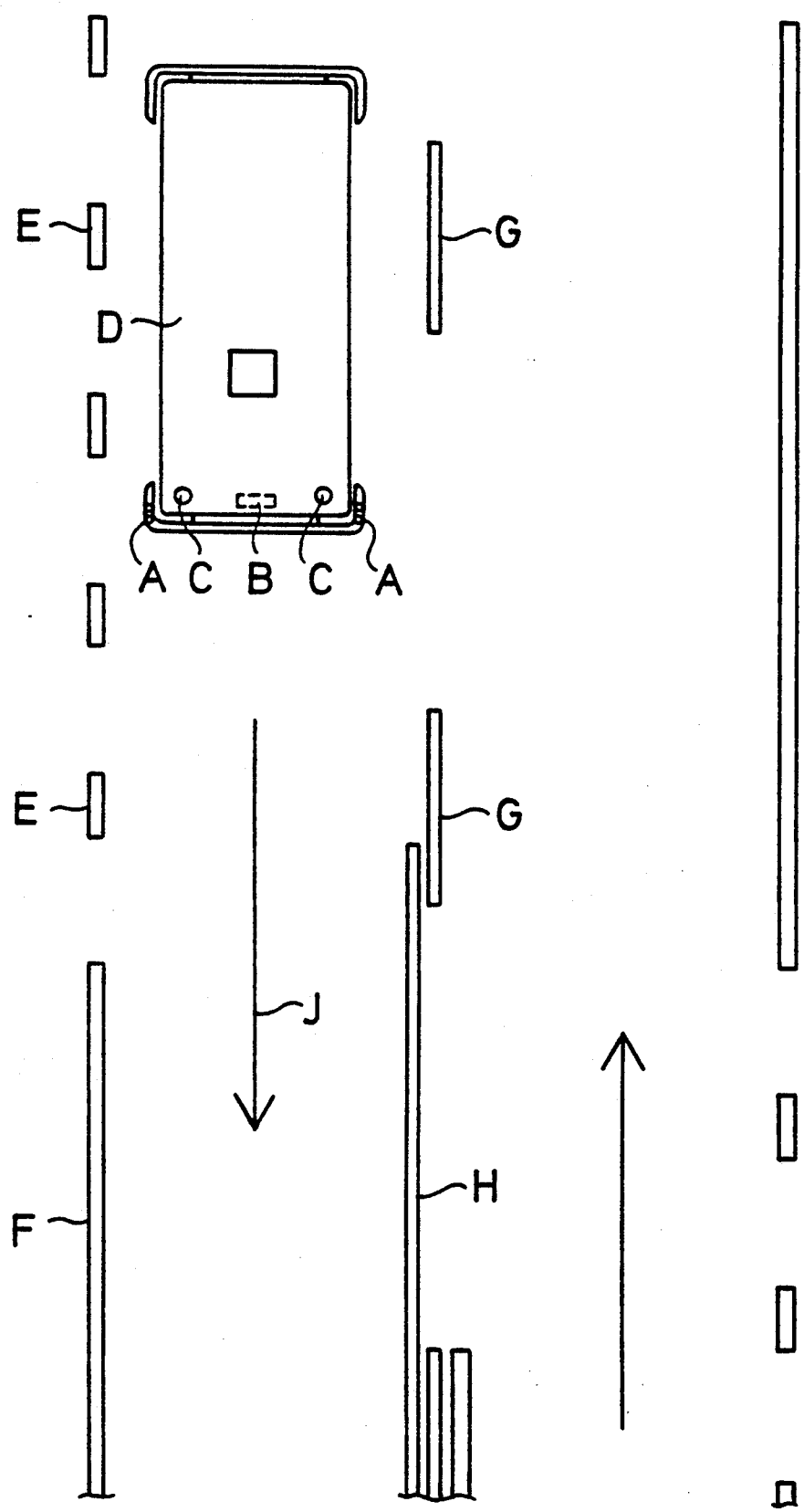

The present invention relates to a warning device for motor vehicles. The device will sense when a road marking line painted on the roadway is unintentionally crossed and will then issue a warning signal to the driver. In FIG. 1 the warning device according to the invention is shown mounted on a motor vehicle D driving in the direction J on a typical roadway having road marking lines of various kinds. In the figure there are shown, by way of example, short edge lines E, a side solid line F, a long centre line G and a centre solid line H. The device comprises a detector A, an electronic unit B an buzzers C, described more detailed below.

Figure 2:
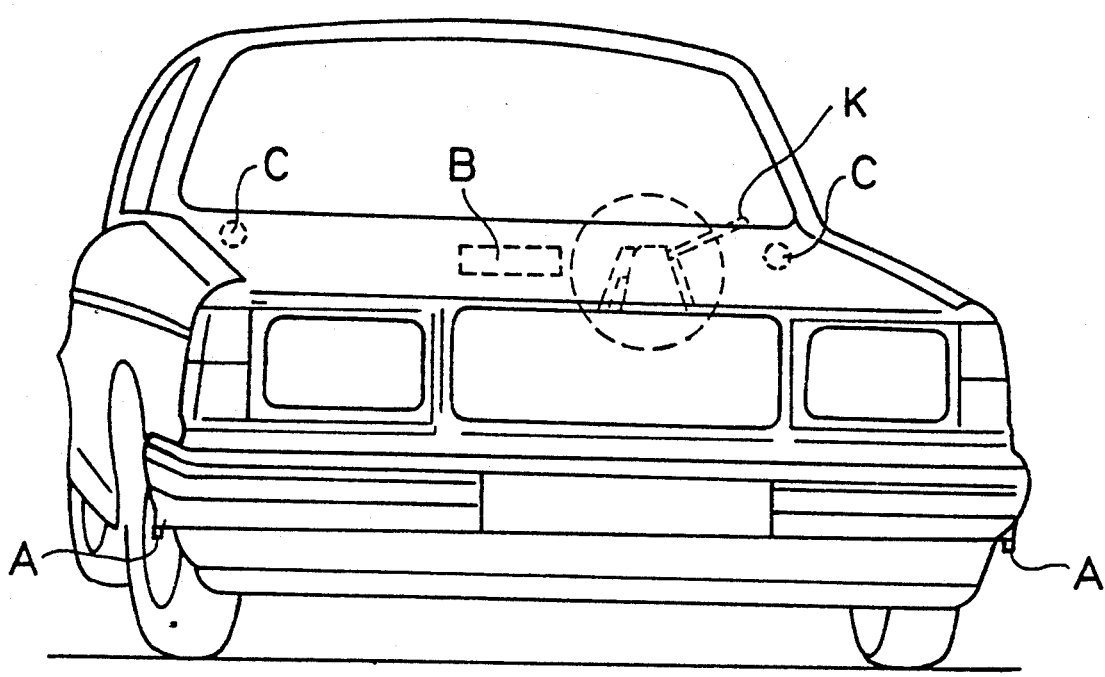
Figure 3:
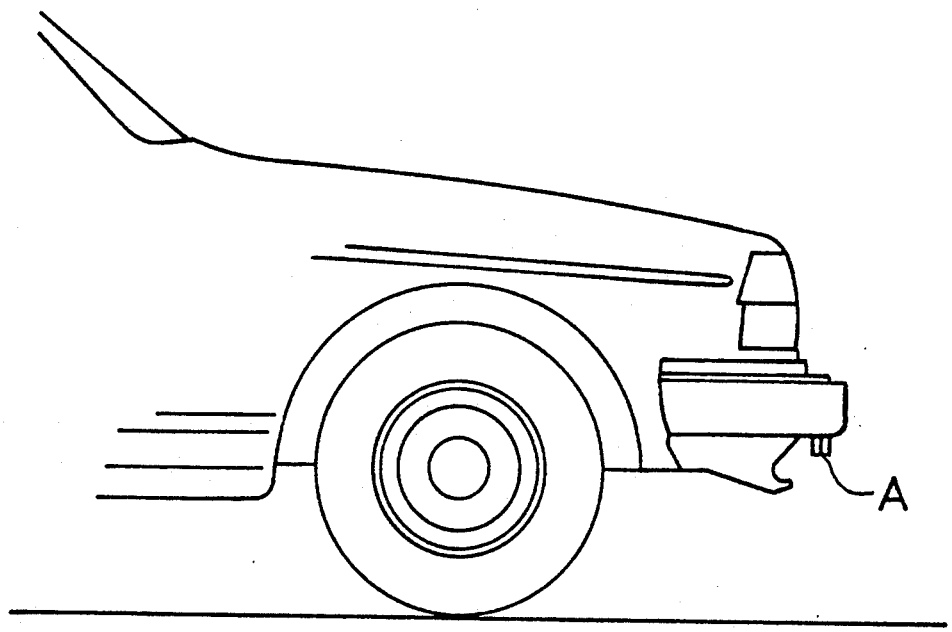

FIGS. 2 and 3 give examples of the installation of the invention in a motor car. The device is also suitable to be mounted in lorries, buses, trucks, and other vehicles.

The warning device is used according to the following. The detector unit A is provided for detecting road lines painted on the roadway. When the unit A is straight above a road marking line a signal will be delivered to the electronic unit B, which unit will activate a device for issuing an acoustic (buzzers C) and/or a visual signal to the driver. Tests have shown that in normal driving on main roads the duration of the warning signal should be 3-5 seconds. The electronic unit thus provides for the warning signal to remain during an appropriate period of time after the road marking line has been crossed and the detector unit A no longer remains over the line. This is because the driver should have time for perceiving the signal and for responding.

The duration of the signal is adjustable by a control, suitably on the dashboard. In driving in a dense fog and in parking, the warning signal, for instance, should sound (light) only the period of time during which either of the detectors A is straight above a white marking line to help the driver orientate himself more exactly.

The buzzers C are constructed so as to issue a signal with distinctly separable frequencies for the left-hand and the right-hand side, so that the driver's attention will be instantly drawn to which direction the incorrect change of course has been made.

There are occasions when intentionally you want to cross the marking lines, e.g. in change of lanes, at turns, at crossings, and so on. Then, it is not desired to be bothered by warning signals, so there must be a possibility of deactivating them. According to the invention the warning device may be permanently deactivated by means of a main switch, but there are various possibilities of a temporary deactivation as well. Since marking lines are often crossed at turns it is suitable to arrange an interruption in connection with the direction indicator K. This would also contribute constructively to an increased use of the indicators. According to the invention the warning device will be deactivated when you begin to signal and remains deactivated for a certain period of time after the actuator of the indicator K has been brought back to neutral. The time period during which the warning device is deactivated be fixed, e.g. 15 seconds, or variable by means of a control.

According to the invention the warning device may also be temporarily deactivated a special control for this purpose. This control will be used when a marking line is to be crossed without signalling for a left or a right turn. It may suitably be arranged in form of a nonlocking control near the indicator control. In other respects, the deactivation will be effected in the same way as above.

The technical construction of the warning device is described more closely below with reference to FIGS. 4 and 5.

Figure 4:
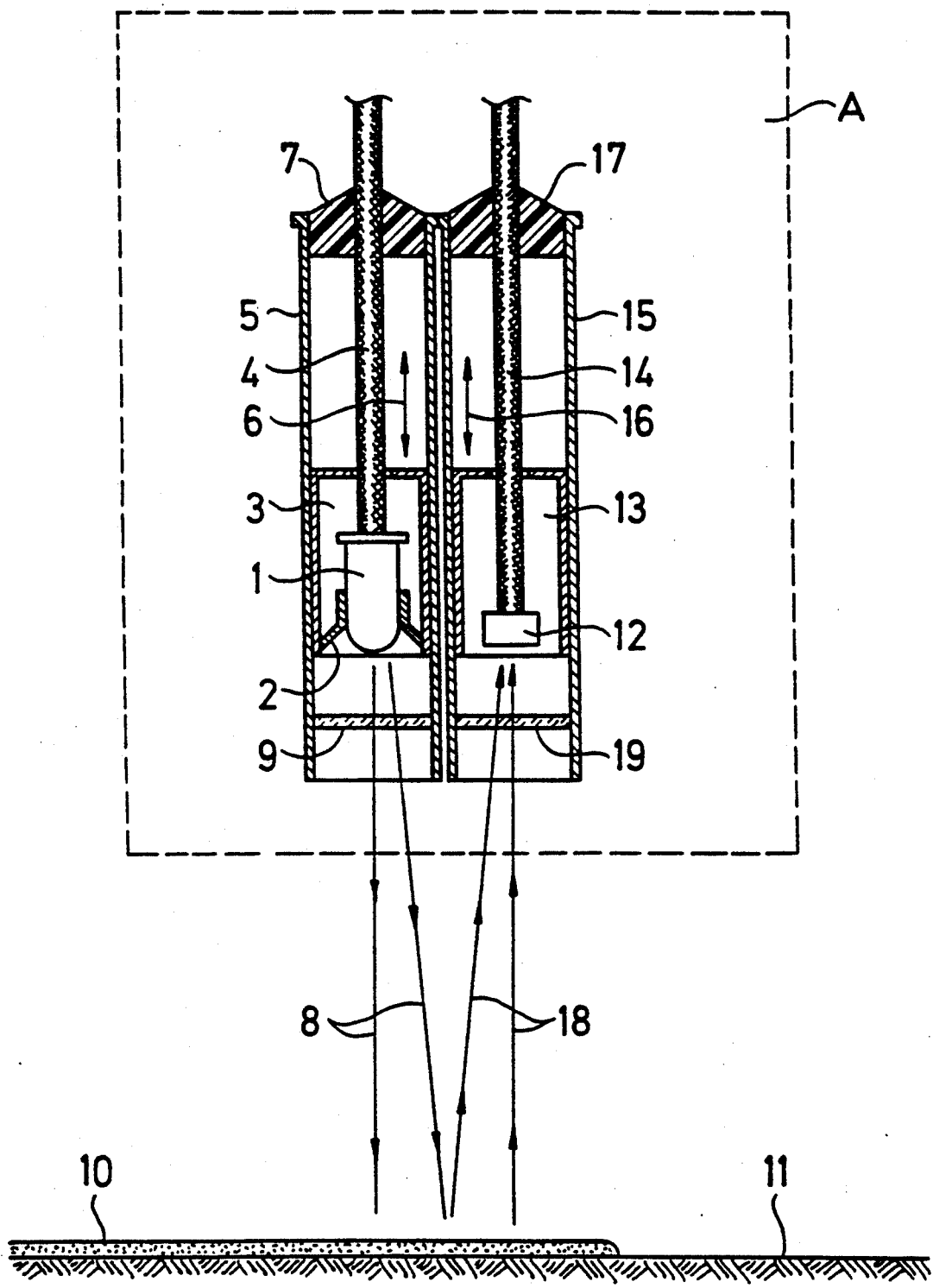

The detector unit A in FIG. 4 comprises an IR transmitting diode 1, a reflector 2, and a holder of Plexiglass or the like 3. Transmitting diode 1, reflector 2 and holder 3 are joined and vertically adjustable within a chromium-plated metal tube 5 according to the arrow 6. Receiving diode 12 and holder 13 within tube 15 have the same possibility of adjusting according to the arrow 16. The possibility of adjusting admits adaptation of sensitivity and range. To prevent soiling of the unit the transmitting and the receiving diodes are preferably mounted as high as possible within the metal tubes 5, 15. The mouths of the metal tubes may as well be provided with transparent protective discs 9, 19.

A detector unit A is preferably arranged in either of the front bumper corners of the vehicle, as shown in FIG. 2. The distance from the units to the roadway is adapted with respect to the type of vehicle. Appropriate distances are in the range of 15 to 40 cm, preferably 25 to 30 cm.

Figure 5:
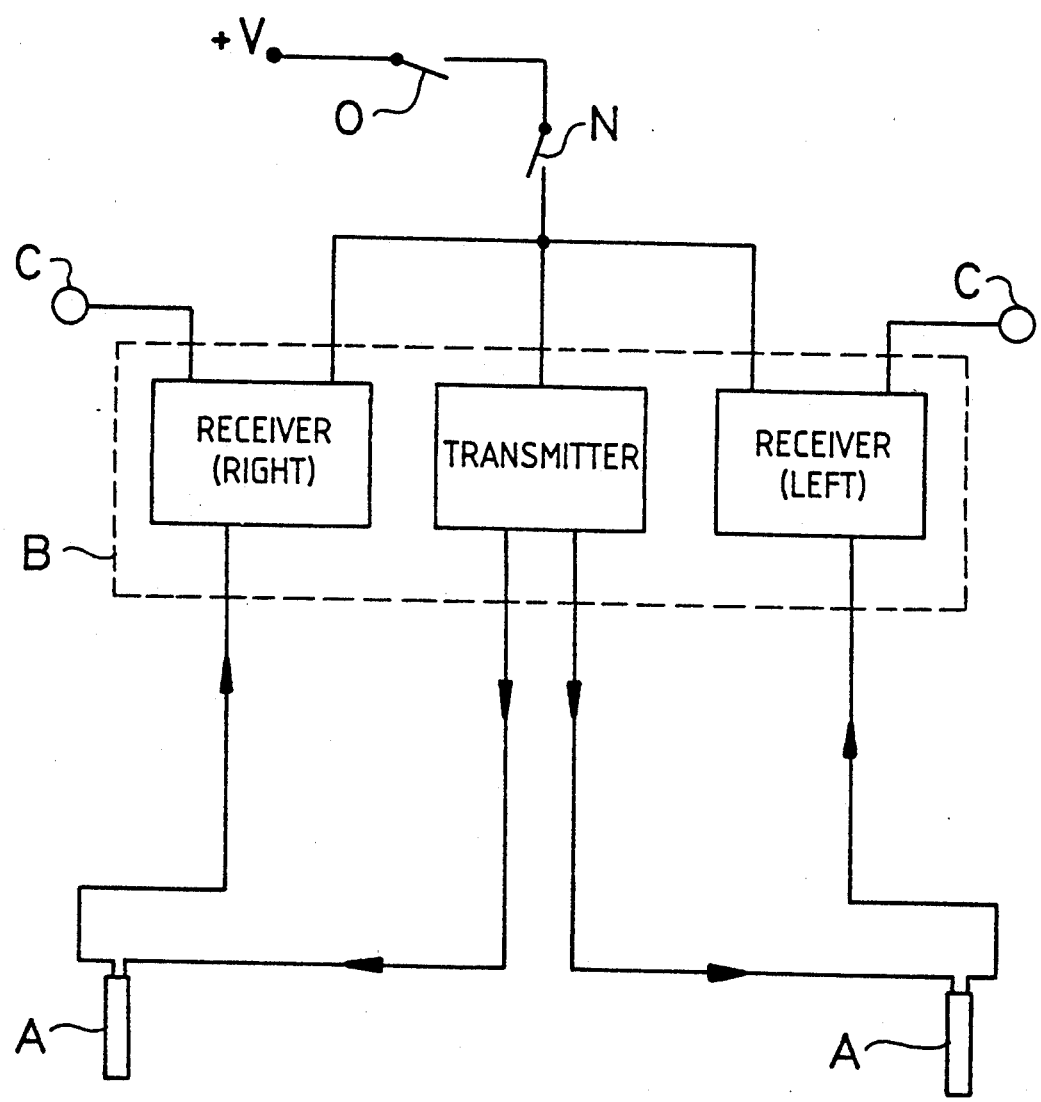

Transmitting part S of FIG. 5 emits a pulsed signal voltage with the frequency of about 10 kHz and is connected via a screened cable 4 through a sealing 7 to the detectors A and the IR transmitting diode 1 of FIG. 4 being therein. This diode emits a pulsed IR light which has the frequency of about 10 KHz corresponding to the pulsed voltage signal and illuminates part of the roadway 11. Upon touching of a white marking line 10 the pulsed IR light 8 is reflected back to the detector A and the IR receiving diode 12 being therein, the sensitivity range of which is adapted to the pulsed IR light 18 of FIG. 4. The receiving diode 12 is via a cable 14 through a sealing 17 connected to the left or the right part of the receiving unit of FIG. 5. The receiving part delivers a signal voltage to the buzzer C of FIG. 5 of the side which corresponds to the IR diode that has activated the receiver. The receiving parts receiver left and receiver right are provided with a ganged switch for choosing an appropriate duration of the warning signal.

A breaker N symbolizes the temporary deactivation of the device, as described above. In practice, the breaker may be arranged in many different ways, preferably as an electronic control of the effect of the transmitting part S. The breaker is connected to the control for the direction indicator and for temporarily deactivating the device.

The breaker 0 of FIG. 5 relates to a main switch for switching on and off the device.

The transmitting part S is provided with a potentiometer for controlling the signal voltage level to the IR transmitting diodes 1 of FIG. 4 for adapting the range and sensitivity of the device in a great deviation in the reflective power of the white marking lines.

I claim:

1. A warning device in a motor vehicle for issuing warning signals in case the vehicle will unintentionally deviate from a proper roadway and thereby cross the center or the edge line of the roadway, comprising an optical light transmitter for emitting light towards the roadway, a light receiver for detecting the light reflected by a white-painted road line on the roadway and for converting the light into an acoustic and/or optical warning signal, clearly perceivable to the driver, wherein the light transmitter and light receiver are operated by IR light, the light transmitter being an IR transmitting diode emitting a pulsed IR light;

wherein upon an intentional crossing of the road line, the function of the warning device will be interrupted by use of a control or a direction indicator and remain interrupted during a predetermined fixed or a variable period of time after the eontrol is released or an actuator of the direction indicator is brought back to neutral;

the duration of the warning signal being adjustable by the control; and the acoustic warning signal being produced by buzzers which are constructed so as to issue signals with distinctly separable frequencies for the left-hand and right-hand side of the motor vehicle, respectively.

2. The warning device according to claim 1, wherein the IR light is pulsed with a frequency of about 10 kHz.

3. The warning device according to claims 1 or 2, wherein two units, each of which integrated are the IR transmitter and the IR receiver, are provided respectively in corners of a front bumper.

4. The warning device according to claim 3, wherein the distance from the units to the roadway is adapted with respect to the type of vehicle preferably 25-30 cm.

5. The warning device according to claim 4, wherein each said unit as a whole is vertically adjustable or the IR transmitter and the IR receiver are vertically individually adjustable within the respective unit.

6. The warning device according to claim 5, wherein the IR transmitting diode and an IR receiving diode are adjustably built into a chromium-plated metal tube respectively, the mouths of which face the roadway, to protect against splashing road dirt and may be provided with transparent protective discs.

* * * * *